United States Patent [19]
Feal et al.

[11] Patent Number: 5,554,394
[45] Date of Patent: Sep. 10, 1996

[54] ROTATIONAL THERMAL MOLDING MACHINE

[75] Inventors: Joseph Feal, Bayshore; Stephen Bacskay, Central Islip, both of N.Y.

[73] Assignee: Rototron Corporation, North Babylon, N.Y.

[21] Appl. No.: 331,475

[22] Filed: Dec. 6, 1994

[51] Int. Cl.⁶ ........................................ B29C 5/04
[52] U.S. Cl. .......................................... 425/434; 425/435
[58] Field of Search ...................... 425/430, 434, 425/435, 574, 575, 576

[56] References Cited

U.S. PATENT DOCUMENTS

| | | | |
|---|---|---|---|
| 3,510,911 | 5/1970 | Alter | 18/26 |
| 3,703,348 | 11/1972 | Pivar | 425/173 |
| 3,841,821 | 10/1974 | Pivar | 425/434 |
| 3,885,016 | 5/1975 | Pivar | 264/269 |
| 3,914,105 | 10/1975 | Pivar | 425/435 |
| 3,997,649 | 12/1976 | Pivar | 264/310 |
| 4,022,564 | 5/1977 | Dawson | 425/430 |
| 5,022,838 | 6/1991 | Payne | 425/145 |

*Primary Examiner*—Tim Heitbrink
*Attorney, Agent, or Firm*—Ladas & Parry

[57] ABSTRACT

A molding apparatus is provided which consists of three frames which are relatively pivotal with respect to one another. One frame (A) is cradled in a second frame (B) and provision is made for tilting the first frame relative to the frame in which it is cradled. The cradling frame and the frame cradled therein are made tiltable relative to third frame (C). The tilting operations are effected by hydraulic piston and cylinder arrangements (170, 176). The method of the invention consists of cradling the first frame in a second frame, tilting the first frame relative to the second frame to a certain angle of inclination and thereafter tilting the cradling second frame along with the cradled first frame therein to a second angle of inclination relative to the third frame.

20 Claims, 5 Drawing Sheets

ROTATIONAL THERMAL MOLDING MACHINE

FIELD OF INVENTION

This invention relates to an apparatus and method for molding thermoplastic materials and the like and more particularly to apparatus and methods for manipulating molds to assume different molding operation postures.

BACKGROUND

A manual method for the molding of thermoplastic materials is disclosed in U.S. Pat. No. 3,703,348 (S. Pivar). According to the techniques disclosed, a frame or stand is provided which has two stable positions. These are selectively employed to hold a mold in inclined or horizontal attitudes, the mold being provided with an open end on which is placed a cover with an opening therein so that access to the interior of the mold is possible. Thermoplastic material is placed in the mold which is thereafter heated so that the material fuses to the mold and the desired article is thereby formed. Access to the interior of the mold permits improved control over the formation of the object being molded.

Thermoplastic articles have long been made by various well known processes. These processes include blow molding, thermal forming, and rotational molding. In one known process, a preheated mold is completely filled with molding powder some of which becomes congealed on the mold surface and the balance of which is removed. In another known process, an excess of molding powder is introduced into a preheated mold which rotates about an inclined axis. In this procedure, a pressing wiping force causes some of the powder to congeal onto the mold surface. The balance of the powder is allowed to fall out of the mold during rotation.

In yet another known rotational molding process, an enclosed mold containing molding powder is rotated inside of an oven simultaneously about mutually perpendicular axes. It is also known that the enclosed mold can be rotated about one axis while being subject to a continuous oscillatory motion about a transverse axis.

In U.S. Pat. No. 3,841,821 (S. Pivar) is disclosed a technique of molding a plurality of pan shaped plastic articles simultaneously. A plurality of open pan shaped molds are coaxially arranged along an inclined axis with a frame supported on shafts being inclined to the horizontal. Plastic poured into the individual molds is fused by a burner arranged below the frame and parallel to the aforementioned axis.

Still another technique is set forth in U.S. Pat. No. 3,885,016 (S. Pivar) wherein a measured amount of thermoplastic material is deposited in a hollow metal mold which is rotated about a horizontal axis until a layer of partially fused material is formed against the side wall of the mold. The mold is then pivoted to an attitude which is inclined relative to the horizontal and the mold in this attitude is heated for an additional period of time until a layer of partially fused material is formed against the bottom wall. The heating of the mold is continued until at least substantially all of the material is fused whereafter the mold is cooled and the thusly molded article removed from the mold.

An apparatus is disclosed in U.S. Pat. No. 3,914,105 (S. Pivar) which is also intended for the molding of a hollow thermoplastic article. This apparatus includes a hollow mold including first and second complementary mold parts having a common axis of rotation. The mold parts are provided with engageable edges at which the parts abut in order to seal the mold against leakage of the thermoplastic material. A releasable clamp is provided to clamp the parts for rotation together so that the thermoplastic material can be processed.

Still another technique is revealed in U.S. Pat. No. 3,997,649 (S. Pivar). In accordance with this technique, a charge retaining member is provided in association with the mold adjacent the opening therein, this member being perpendicular to the axis of the mold and defining an opening symmetrically disposed about this axis and of a size to permit the insertion of a plastic charge into the mold during its rotation. An elongated burner is provided which extends along the mold parallel to the horizontal axis thereof. Blowers are provided for blowing cooling air into the mold and through the abovementioned opening when the molding has been completed. This permits the mold to be preheated and a plastic charge inserted into the mold after preheating, the charge being fused and thereafter cooled, the article which is formed being removed from the mold via the opening therein.

In still a further technique revealed in U.S. Pat. No. 4,022,564 (J. Dawson) a molding apparatus is provided with a frame including a part acting as a mold support. This part is pivoted between two angular limits and carries a gear wheel to be pivoted therewith. Planetary gears are engaged with the gear wheel and are displaced pivotally around the gear wheel to be rotated by the same. Molds are coupled to the planetary gears to be rotated therewith. Heating devices are located below the molds to the heat the same as they are being rotated.

SUMMARY OF INVENTION

It is an object of the invention to provide improved methods and apparatus for the molding of thermoplastic materials and the like.

It is another object of the invention to provide an improved method and apparatus for realizing the advantages of the abovementioned processes in a technique which is substantially fully automatic or mechanized.

Yet another object of the invention is to provide an improved technique and apparatus for the molding of thermoplastic materials and the like wherein the position of an associated pivot shaft is optimized.

Still another object of the invention is to provide an improved technique and apparatus for the molding of thermoplastic materials wherein a cradle is maintained relatively flat on a supporting surface to facilitate loading.

Another object of the invention is to provide an improved technique and apparatus for the molding of thermoplastic materials wherein an associated mold can be tilted between opposite and opposed attitudes which are inclined at an angle which is adjustable.

Still another object of the invention is to provide for the utilization of adjustable limit switches for the operation of automatic apparatus for the molding of plastic articles.

Other objects of the invention include facilitating the handling of molds during loading and unloading procedures while preferably avoiding excessive physical labor to lift such molds which may be of a very large size. Still other objects include providing an open flame heating unit wherein the open flame travels with the mold.

To achieve the above and other objects of the invention there is provided, in accordance with a preferred version thereof, a molding apparatus comprising a mold supporting device for supporting a mold for rotation about an axis of rotation, a cradle for accommodating the mold supporting device with its axis in generally horizontal attitude, a control device for displacing the mold supporting device relative to the cradle to tilt the axis to a first inclination angle and then to return the mold supporting device to the cradle, the control device further displacing the cradle and the mold supporting device accommodated therein to a second inclination angle generally opposite to the first said inclination angle.

According to a preferred version of the above apparatus there is further provided an arrangement supporting the molding supporting device and cradle for displacement about a pivot axis generally perpendicular to a plane passing through and coincident with the aforementioned axis of rotation. The plane as will be seen in the detailed description which follows hereinbelow is preferably vertical.

According to a feature of the invention, the above indicated control may include first and second controls respectively tilting the mold supporting device to the first and second inclination angles. According to another feature, a stationary frame is provided relative to which the mold supporting device and cradle are pivotally displaceable. Still another feature finds a heating arrangement displaceable with the mold supporting device for the heating of the mold.

Some other features of the invention include the provision of an arrangement for controllably selecting values for the abovementioned angles and an arrangement to bring the mold to the mold supporting device. According to other features and advantages, the abovementioned controls include piston and cylinder arrangements as well as limit switches to select maximum values for the abovementioned angles and timing apparatus to establish a period of dwell at the various values.

Viewing the invention from another stand point, there is provided a molding apparatus comprising first, second and third pivotally interconnected frames. The first frame includes an arrangement for rotating a mold on an axis of rotation. A first control is provided which is coupled between the first and the second frames for pivotally displacing the rotating arrangement relative to the second frame to tilt the axis of rotation to a first angle of inclination. A second control is provided for pivotally displacing the second frame along with the first frame relative to the third frame to tilt the axis of rotation to a second angle of inclination.

As will be shown in detail hereinafter, the second control includes at least one arm pivotally coupled between said third frame and the second frame and a controllable extension arrangement pivotally coupled between the arm and the third frame to control the displacement of the second frame.

As will also be shown hereinafter, the third frame includes spaced parallel tracks with the first frame including rollers accommodated in these tracks. The third frame supports the first and second frames.

According to the method of the invention, there are employed the steps of cradling a first frame in a second frame, mounting a mold on the first frame for rotation thereon, loading the mold with a thermally moldable plastic and tilting the first frame relative to the second frame to spread the plastic in the mold. Thereafter, the first frame is returned to a cradled position in the second frame, and the second frame is tilted with the first frame cradled therein to bring the first frame to a second tilted position. The mold is heated at least while the mold is in the tilted positions in order to mold the plastic. The mold is moreover preferably tilted between positions which are substantially both equal and opposite in angular magnitude. This tilting may be hydraulically effected in a preferred version.

The above and other objects, features and advantages of the invention will be made apparent in the detailed description which follows hereinafter as illustrated in the accompanying drawing.

DETAILED DESCRIPTION

Figure 1:
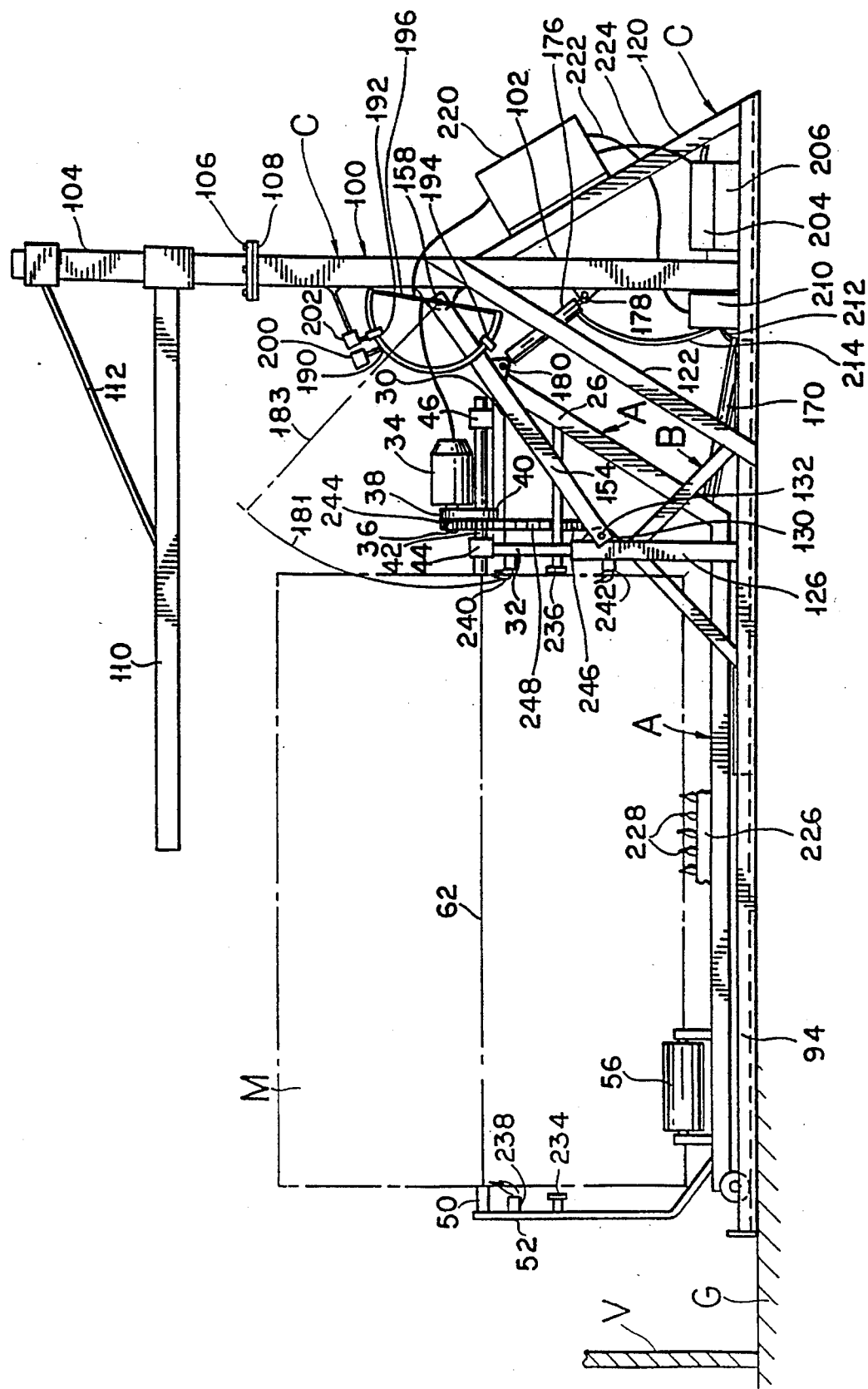
FIG. 1 is a side view of a molding apparatus provided in accordance with the invention.

Further to the objects mentioned above, it is an object of the invention to provide a means to support a large mold for multi-axial rotation which can be attended by operators at floor level. Still another object is to support the mold and the means of providing multi-axial rotation at one end of the mold so as to leave the opposite end unencumbered and thereby accessible to be opened for charging and for removing the finished molded part, and recharging of the mold.

Rotational molding is a basic process used in the molding of thermoplastic synthetic resins which originated in the late 1950's. It is based on the phenomenon that finely divided thermoplastic resins melt and cling to the inner surface of a heated hollow mold and will form a continuous layer against the entire surface if the mold is rotated simultaneously or consecutively about one or more axes. The process has since come into wide commercial use for the production of hollow thermoplastic parts of about one to one thousand cubic feet in enclosed volume. They range in diversity from children's hobby horses to ten thousand gallon chemical storage tanks. Various machines have been contrived to heat molds and to support and subject them to multi-axial rotation. Molds can be heated by ovens during rotation by the circulation of heated fluids within the walls of the molds, by the rotation of the molds over open flames and by rotation of the molds while they are showered with heated inorganic salts.

In the rotational molding process, a hollow metal mold is charged with liquid or powdered thermoplastic in an amount equal to the weight of the finished part. The mold is heated externally by placing it in an oven or above or adjacent heat sources such as gas burners or electric elements while subjecting it to slow rotation about mutually perpendicular axes so as to distribute the charge about the interior walls of the mold where it can cure or melt due to contact with the heated surface thereof and subsequently harden when the mold is allowed to cool.

various mechanical means have been used to support molds for rotation about mutually perpendicular axes. The longitudinal axis of the mold is usually subject to full and continuous rotation. In one alternative, the mold is fully and continuously rotated simultaneously about another axis perpendicular to the first and which passes through the first axis at a point in the center of the interior of the mold. In another alternative, the mold is subjected simultaneously to partial rotation about an axis which passes through the first axis at a point outside one end of the mold causing it to tilt at an angle of approximately 45 degrees to the first axis.

When large molds are used, that is, molds in excess of three or four feet in one dimension, they describe large arcs in the vertical plane and must be supported high above the floor or alternatively above a large pit excavated in the floor. Both of these alternatives present serious disadvantages concerning efficiency of operation, cost and safety of the operators inherent in the use of an elevated working platform or pit.

A method of avoiding the need for the elevated work platform and the excavated pit is the use of mechanisms to alternately lift each end of a ground level mold. However, the use of large molds can necessitate the use of heavy, bulky mechanism at each end of the mold which interfere with access to the end of the mold for the purpose of opening the end of the mold for charging and for removal of the finished part. The present invention solves this problem by use of a mechanism for rotation about three axes which are located at only one end.

The mechanism used to effect mutually perpendicular rotation about three axes described in detail below consists generally of three frames, or cradles each capable of independent motion with respect to the others connected by systems of levers and powered by hydraulic cylinders and electric motors. The mold is supported for rotation and rotated continuously about a primary longitudinal, generally horizontal axis. This axis is caused to rotate alternately through partial arcs about two centers each in a plane perpendicular to the primary axis, one of which is fixed, while the other is movable. The first perpendicular axis intersects the primary axis at a point a short distance outside the enclosed space of the mold, and remains fixed during rotation. This axis of rotation is caused to rotate the mold through an arc of approximately forty to sixty degrees from the horizontal and thence to reverse this rotation until the mold is restored to the horizontal. Following these rotations of the first perpendicular axis, the mold is caused, to rotate about the second perpendicular axis. The locus of the intersection of this center of rotation with the primary axis is itself movable. It describes an upward arc as the structure which supports the end of the mold is free to roll horizontally in response to the uplifting force which effects this rotation. This mold is caused to rotate about an arc of 40 to 60 degrees from the horizontal, upon which rotation is reversed to return the mold to the horizontal in a generally similar manner to the motions of the first perpendicular axis except for the movable characteristic of the center of rotation of the axis.

The use of the above described configuration of rotational motions of the mold, accomplished by the use of three interconnecting support cradles activated hydraulically and by electric motors, achieves the purpose of a floor-level-use rotational molding machine with convenient access to one end of the mold.

The invention provides the use of three axes of rotation of a mold for rotational molding including a longitudinal, normally horizontal primary axis which rotates continuously in full arcs which is subject alternately to rotation through two secondary arcs each intersecting the primary axis of rotation at points outside opposite ends of the mold, and each causing the primary axis to elevate from the horizontal through an upward arc of about 45 degrees and then, by reversing this rotation, to restore the primary axis to the horizontal. This process is followed consecutively by the elevation of the primary axis from the horizontal in the opposite direction and the subsequent return to the horizontal by the second of the secondary axes. The invention further provides a configuration of three axes of rotation consisting of a primary axis, generally horizontal and longitudinal which is elevated from and returned to the horizontal, alternatively in opposite directions of rotation about two secondary axes, each of which intersects the primary axis at a point outside the external boundaries of the mold, one of which is fixed and the other of which is movable in an upward arc.

The invention also provides mechanical structure to support the mold for rotation about three axes and a heating arrangement to heat the mold during rotation. The mechanical structure consists of a main stationary frame which supports a secondary frame which is movable with respect to the main frame through an angle elevated from the horizontal and furthermore of a third frame which is supported by the second frame, and which is movable with respect to the second frame through an angle elevated from the horizontal and which third frame supports the mold for continuous rotation through the longitudinal axis of the mold and which third frame also supports the heating arrangement contiguous to the mold but which does not rotate with the mold.

Still further, the invention provides a machine for the rotational molding of thermoplastic materials which subjects the mold to continuous rotation through a longitudinal axis which concurrently elevates ends of the mold to an angle of elevation from the horizontal of about 45 degrees and a machine which supports the mold for these rotations and also the motors and hydraulic and mechanical devices at one end of the machine whereby the opposite end of the machine remains unencumbered so that access to the end of the mold is such as to enable efficacious recharging.

Figure 2:
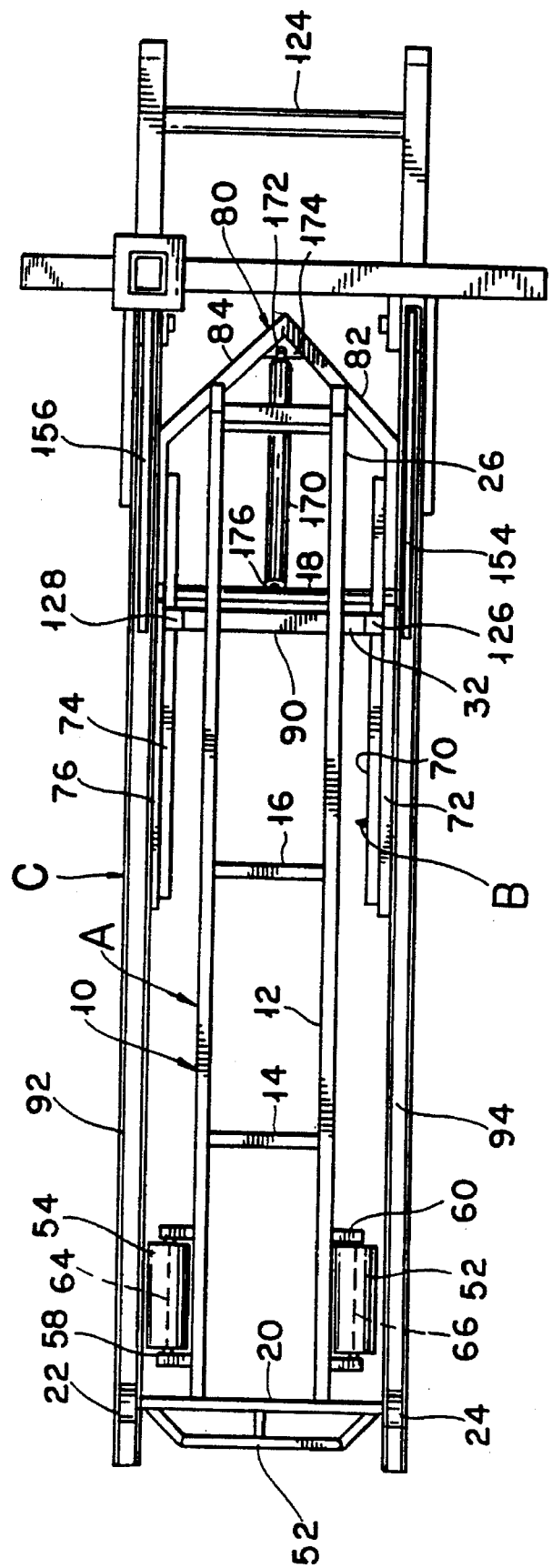
FIG. 2 is a top view of the apparatus of FIG. 1.
Figure 3:
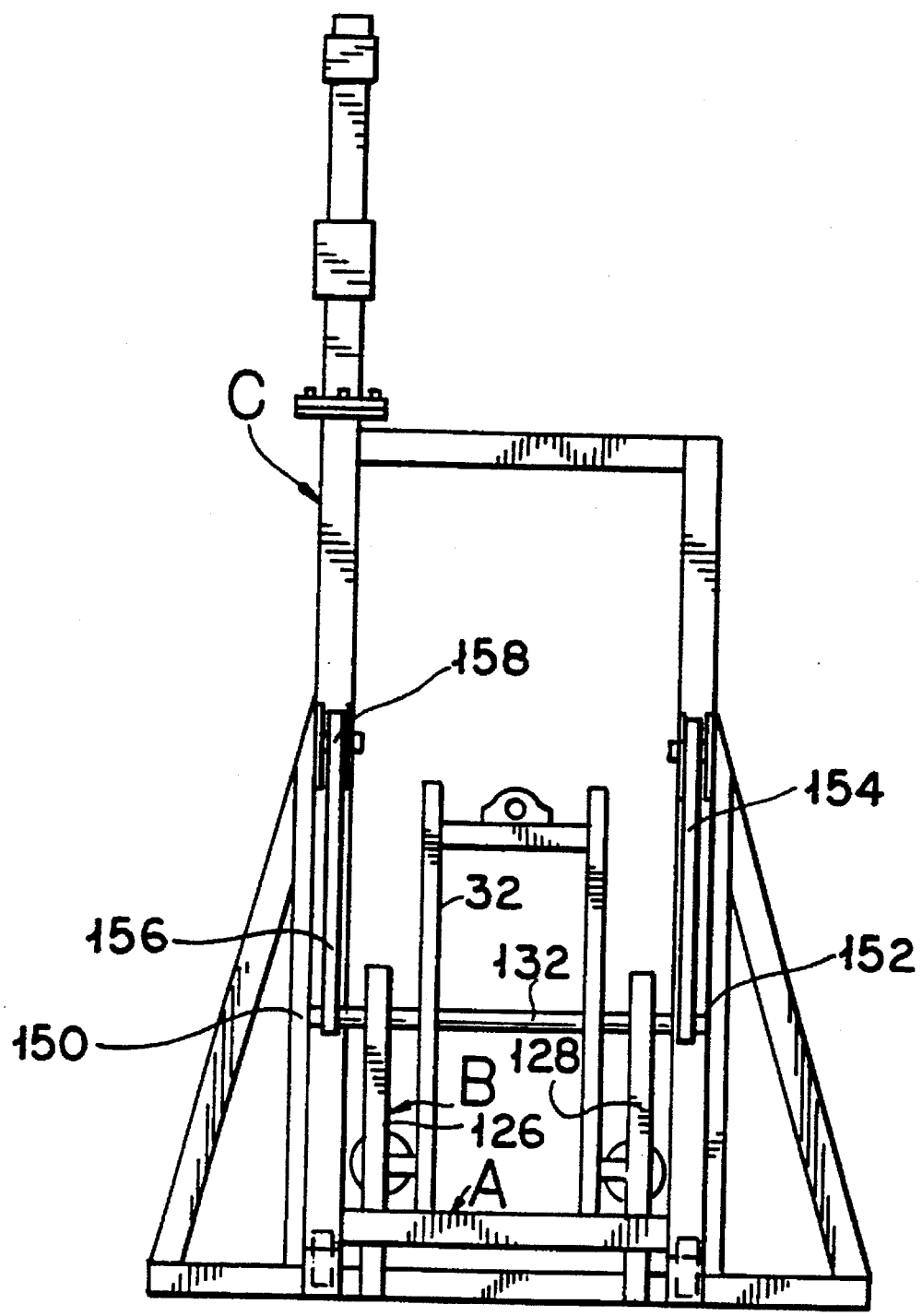
FIG. 3 is an end view of the apparatus of FIGS. 1 and 2.

The apparatus illustrated in FIGS. 1–3 is a molding apparatus intended to manipulate a preferably hollow cylindrical mold rotatably on its own axis. For this purpose, the apparatus consists of three frames A, B and C. Frame A is pivotal relative to frame B and frame B acts as a cradle for frame A. Frames A and B are pivotal together relative to frame C.

More particularly, frame A consists of two lateral beams 10 and 12 connected together by transverse beams 14, 16 and 18. A further beam 20 connects the ends of beams 10 and 12 and supports wheels 22 and 24. The head end of frame A is indicated at 26. It slopes upwardly at an angle for example of approximately sixty degrees. It carries horizontal beam 30 as well as vertical beam 32. Together these constitute a support for a motor 34 having a rotatable shaft 36 which through the intermediary of a chain 38 drives a cogwheel 40. Cogwheel 40 is mounted on and drives a shaft 42 supported in bearings 44 and 46 supported on a table including horizontal beam 30. Mold M is mounted in any of a variety of known ways, as will be hereinafter discussed, on the shaft 42. The other end of the mold is supported on a pivot 50 supported in a subframe 52 mounted on the frame A. Also mounted on the frame A are a pair of rollers 54 and 56 held in position by supports 58 and 60. The axis of mold M is indicated at 62 whereas the axes of rollers 54 and 56 are indicated at 64 and 66. The axes 62, 64, and 66 are preferably parallel and furthermore are horizontal in the relative positions illustrated in FIGS. 1–3.

The frame B consists of beams 70 and 72 as well as beams 74 and 76. Frame B moreover consists of a triangular section 80 including angularly disposed beams 82 and 84. Beams 70, 72 on the one hand and 74, 76 on the other straddle frame A and constitute a cradle for frame A which in a position of rest sits atop crossbeam 90 of frame B.

Frame C consists of beams or tracks 92 and 94 which define channels accommodating wheels 22 and 24. Tracks 92 and 94 are intended to rest on the ground G or on top of a cement floor or the like having suitable strength to support the molding apparatus illustrated in the drawing. Frame C moreover includes a vertical beam 100 including parts 102 and 104 connected together by matching flanges 106 and 108. Flanges 106 and 108 constitute a convenience for dismantling the vertical beam 100 for purposes of shipment or transportation. Extending outwardly from the beam 100 above tracks 92 and 94 is a horizontal beam 110 reinforced by a diagonal 112. This horizontal beam 110 is exemplary only of a type of device (such as a hoisting bridge) which is suitable as a support for a pulley or chain arrangement capable of hoisting the mold M into position for mounting on the apparatus of the invention. Bracing the vertical beam 100 in position are diagonal beams 120 and 122. Tracks 92 and 94 may moreover be connected by one or more transverse beams such as indicated at 124.

Frame B may moreover include vertical beams 126 and 128. These vertical beams are supplied with ears or tabs 130 capable of engaging a transverse shaft 132 about which frame B is pivotal. Similarly, vertical beam 32 is provided with ears which engage shaft 130. This shaft is moreover supported by frame C as indicated at 150 and 152. This engagement takes place however by virtue of arms 154 and 156 which are pivotally connected to frame C by means of shaft 158. Accordingly, frame A is pivotal relative to frame B by virtue of these frames both being connected to shaft 132 whereas frames A and B are pivotal relative frame C by virtue of arms 154 and 156 which are connected to shaft or pin 158.

Connected between frame A and frame B is an extensible and retractable member such as a piston and cylinder arrangement indicated diagrammatically at 170. This arrangement is connected at one end 172 to the frame B at tab 174 and at the other end 176 to the transverse beam 18. When the extensible member 170 is extended, this permits by virtue of its pivotal connection to frames A and B adjusting the angle of inclination of the frame A relative to the horizontal and relative to frames B and C as will be discussed hereinbelow.

Another extensible and retractable piston and cylinder arrangement is indicated at 176. This piston and cylinder arrangement is pivotally connected by pin 178 to frame C and by pin 180 to arm 154. A second such piston and cylinder arrangement may also make a connection between frame C and arm 156. With frame A cradled in frame B and with piston and cylinder arrangement 176 being extended, the arm 154 and also corresponding arm 156 will sweep through an arc indicated at 181 thereby bringing the arms to a this has the effect of tilting the frame B in such a manner that the mold M is brought to an angle of inclination which is opposite to the first angle of inclination discussed hereinabove.

Connected to the pin 158 is an arcuate member 190 bearing thereon cams 192 and 194. Connection with the shaft 158 is made by chordal member 196. This permits the arcuate member 190 to partake of the pivotal movement of the shaft 158 as a result of which cams 192 and 194 are swept through series of positions in which engagement can be made with limit switches 200 and 202 thereby to operate the same.

Sources of gas and fluid are respectively indicated at 204 and 206 in diagrammatic manner. Fluid is transmitted from source 206 to a distributor 210 which transmits this fluid selectively and in timed manner via hoses 212 and 214 to piston and cylinder arrangements 170 and 176 respectively. When distributor 210 which includes electrically controlled solenoids (not shown) to supply fluid via hose 212 to piston and cylinder arrangement 170 operates, piston and cylinder arrangement 170 extends thereby to pivot frame A relative to frame B as will be discussed in further detail hereinbelow. Similarly as distributor 210 distributes fluid via hose 214 to piston and cylinder arrangement 176, piston and cylinder arrangement 176 causes arms 154, 156 to be driven along arc 180 to assume the position illustrated at 182. This causes frame B with frame A cradled therein to be tilted relatively to frame C as will also be discussed hereinbelow.

A control box for electrical operation of the distributor as well as for other components of the apparatus is indicated at 220 and is mounted for example on diagonal 120. The control consists of conventional switches and timers to control the dwell of the various frames in the various attitudes to which they are transported. An electrical control cable is indicated by way of example at 222. This controls electrical signals to the solenoids in the distributor 210 to effect the type of displacement of the different frames as is required. Another control is indicated at 224. This controls the distribution of ignitable gases to burners mounted on frame A such as indicated by way of example at 226. Diagrammatically indicated are flames 228 which rise upwardly toward the mold thereby to heat the contents of the same in order that thermoplastic materials within the mold can be fused and molded to the mold's inner configuration. Alternative or additionally to the flames, or the burners to be mentioned below, the apparatus can be accommodated within an oven diagrammatically indicated at V. This oven encloses and supplies heat to the mold.

Auxiliary pivots 234 and 236 can be provided, for example, below and adjacent to the first mentioned pivots for the mold (see, e.g. pivot 50 and its companion). Burners 238, 240 and 242 can be mounted so as to move with the angular displacement of mold M or of the mold supported by pivots 238 and 240 when such are used. Pivot 240 can be driven by motor 34 operating in turn through wheels 244 and 246 coupled by chain 248. This auxiliary drive can be used to operate a mold smaller than what is illustrated. Other accompanying adjustments are possible; e.g., rollers 54 and 56 can be mounted with adjustable height.

Figure 4:
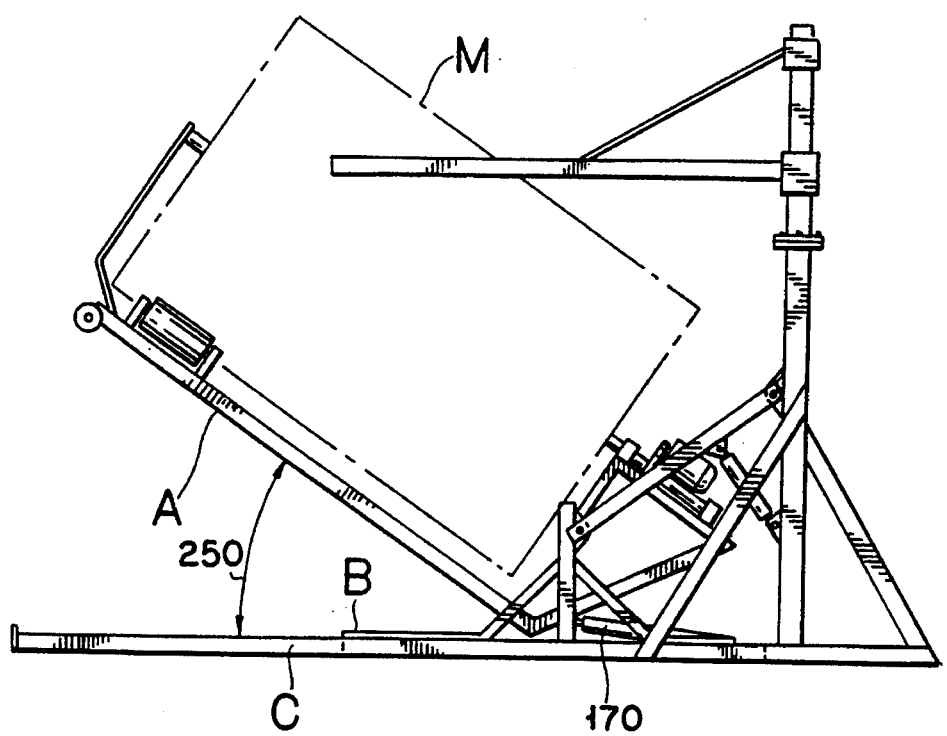
FIG. 4 diagrammatically illustrates a step in the operation of the apparatus of FIGS. 1-3.
Figure 5:
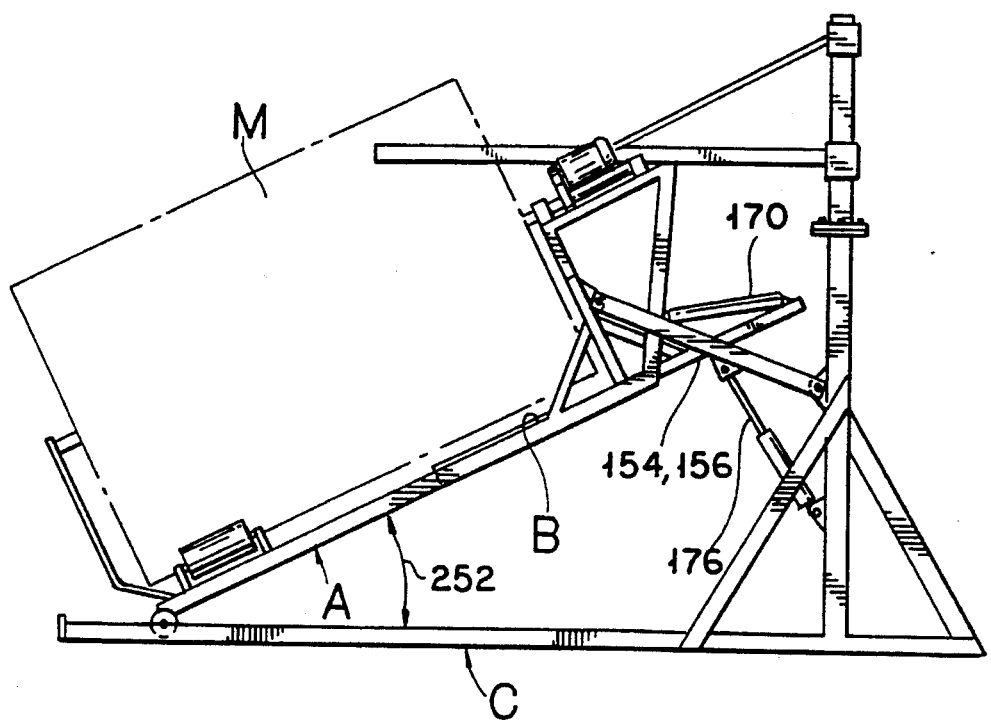
FIG. 5 illustrates another step in the operation of the apparatus of FIGS. 1-3.

The relative attitudes of frames A, B and C as shown in FIG. 1 represent the relative positions at rest of these different frames. As has been indicated hereinabove, frame C retains a stationary attitude and is supported on a supporting surface. Frame A may be said to be horizontal and is cradled in frame B. The axis of mold M is indicated at 62 to be horizontal and the mold M rotates on its axis under the control of motor 34 operating through shaft 36 to drive shaft 42. A first positional change to define an angle of inclination for frame A and axis 62 is illustrated in FIG. 4. Herein, piston and cylinder arrangement 170 has been expanded thereby tilting frame A on shaft 132 relative to frame B. Frame A assumes an upwardly tilted position whose angle is indicated generally at 250. Frame B remains at its position of rest relative to frame C. After a predetermined period of dwell, which for example may be one to twenty minutes in the attitude illustrated in FIG. 4, piston and cylinder arrangement 170 is permitted to contract whereupon frame A reassumes the position relative to frame B which is illustrated in FIG. 1.

Thereafter, piston and cylinder arrangement 176 (and its partner if any) is caused to expand by appropriate action taken through distributor 210 and arms 54 and 56 assume an upwardly tilted position carrying frame B therealong together with frame A cradled therein. Frames A and B together with mold M take an angle of inclination which is indicated at 252 preferably being in equal and opposite magnitude relative to angle 250 in FIG. 4. Mold M is driven in rotation for a period of dwell preferably corresponding to the period of dwell for FIG. 4 thereby to cause additional thermoplastic material to fuse against the mold wall thereby to form the desired article. Thereafter, piston and cylinder arrangement 176 is caused to retract thereby bringing arms 54 and 56 back to the position illustrated in FIG. 1 thereby returning frames A and B to return to their position of rest.

Figure 6:
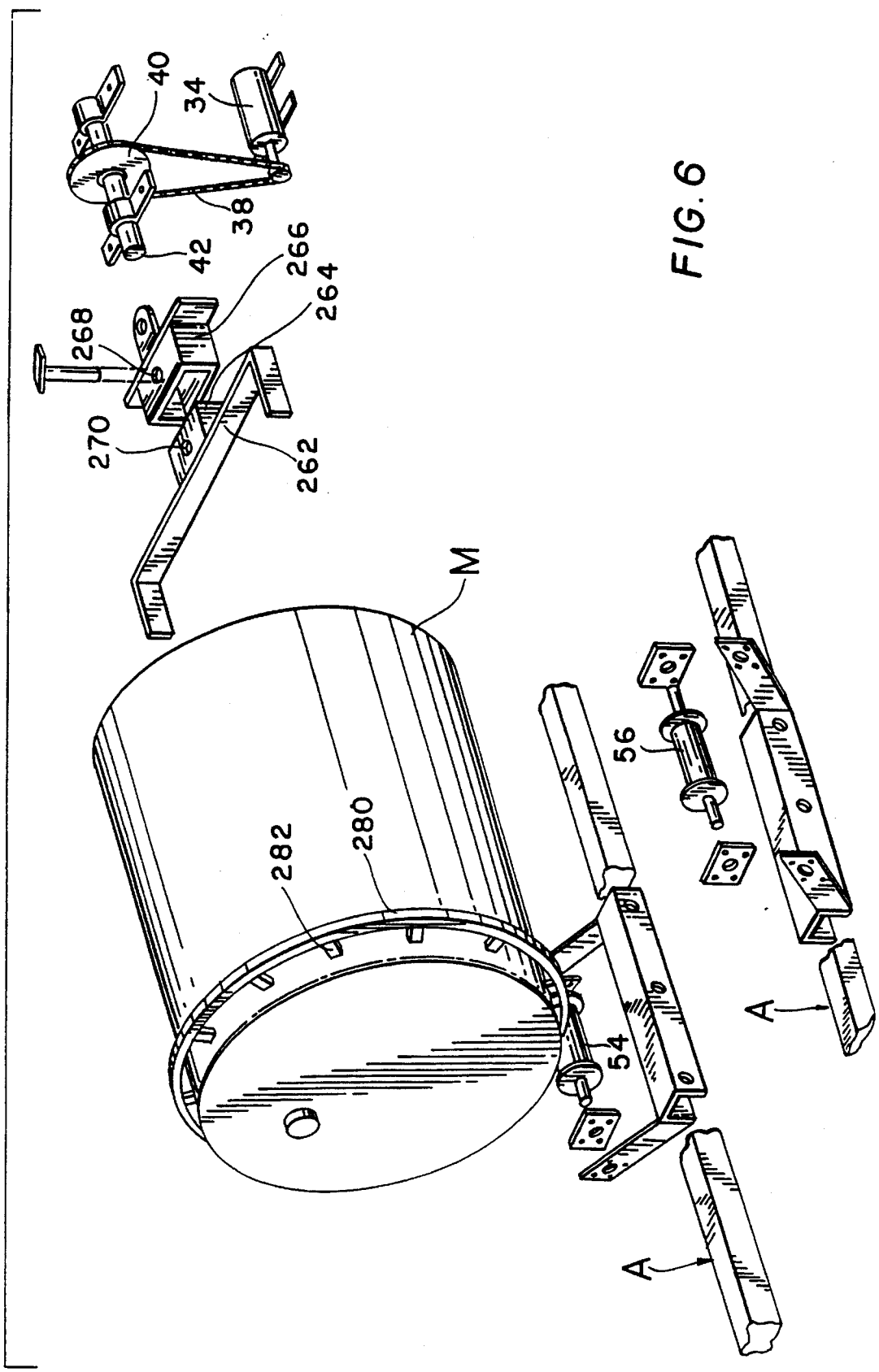
FIG. 6 is an exploded view of a mold and the support and mounting for the same relative to the apparatus of FIGS. 1-3.

Mold M is shown in FIG. 6 in exploded view showing some of the details required for mounting the mold directly on frame A to be driven by motor 34. Also illustrated for purposes of orientation in FIG. 6 are a part of frame A, rollers 54 and 56, drive motor 34, chain 38 and cogwheel 40 along with shaft 42.

Mounted on shaft 42 is a fixture 260 detachably carrying bracket 262 which is adapted for being welded onto the mold M. The bracket 262 carries a plug 264 susceptible of being received in receptacle 266 with provision being made for detachable connection between the two by pin holes 268 and 270. The mold M may be carried by an optional support at the other end but by way of illustration there is illustrated a ring or collar 280 supported by legs 282 on the periphery of the mold so that the ring 280 is concentric. This ring 280 is received by rollers 54 and 56 in order to support the weight of the mold and the material therein while permitting rotation of the mold as caused by the operation of drive motor 34. If desired, a pin and provision for connection with an additional bracket may be installed at the front of the mold thereby to support the weight of the mold in a slightly different manner while permitting rotation of the mold due to the operation of the drive motor.

Thus, it will be generally seen that the invention provides a molding method comprising cradling a first frame in a second frame, mounting a mold on the first frame for rotation thereon and loading the mold with a moldable plastic. Thereafter, the first frame is tilted relative to the second frame to spread the plastic in the mold and the first frame is subsequently returned to a cradled position in the second mold. Next the second frame is tilted with the first frame cradled therein to bring the first frame to a second tilted position. The mold is heated at least while the mold is in its tilted positions thereby to mold the plastic into the desired article. The mold is preferably titled into positions which are substantially equal and opposite in angular magnitude such as for example preferably between 30 and 60 degrees. It will be noted that the mold defines an axis of rotation and the frames are pivoted about an axis which is perpendicular to a vertical plane including the axis of rotation.

There will now be obvious to those skilled in the art many modifications and variations of the apparatus and method set forth hereinabove. These modifications and variations will not depart from the scope of the invention if defined by the following claims.

What is claimed is:

1. Molding apparatus comprising mold supporting means for supporting a mold for rotation about an axis of rotation, cradle means for accommodating said mold supporting means with said axis in generally horizontal attitude, and control means for displacing said mold supporting means relative to said cradle means to tilt said axis to a first inclination angle and then to return said mold supporting means to said cradle means, said control means further displacing said cradle means and the mold supporting means accommodated therein to a second inclination angle generally opposite to the said first inclination angle, said control means including piston and cylinder means coupled to said mold supporting means for displacing said mold to said first and second inclination angles.

2. Molding apparatus as claimed in claim 1, comprising means supporting said mold supporting means and cradle means for displacement about a pivot axis generally perpendicular to a plane passing through and coincident with said axis of rotation.

3. Molding apparatus as claimed in claim 2, wherein said plane is vertical.

4. Molding apparatus as claimed in claim 2, wherein said piston and cylinder means includes a first piston and cylinder means and a second piston and cylinder means for respectively tilting said mold supporting means to said first and second inclination angles.

5. Molding apparatus as claimed in claim 4, comprising stationary means for supporting said mold supporting means and cradle means, said mold supporting means and cradle means are pivotally displaceable with respect to said stationary means.

6. Molding apparatus as claimed in claim 2, comprising heating means displaceable with said mold supporting means for heating said mold.

7. Molding apparatus as claimed in claim 2, comprising means for controllably selecting values for said angles.

8. Molding apparatus as claimed in claim 1, comprising means to bring said mold to said mold supporting means for mounting thereon.

9. Molding apparatus as claimed in claim 1, wherein said control means include limit switch means to select maximum values for said angles and timing means to establish a period of dwell for said mold at said maximum values.

10. Molding apparatus comprising first, second and third pivotally interconnected frame means for pivotally supporting a mold, said first means including means for rotating said mold on an axis of rotation, first control means coupled between said first and second means for pivotally displacing the first means relative to said second means to tilt said axis of rotation to a first angle of inclination, and second control means for pivotally displacing said second means along with said first means relative to said third means to tilt said axis of rotation to a second angle of inclination, said second control means including at least one arm pivotally coupled between said third means and said second means, and controllable extension means pivotally coupled between said arm and third means to control the displacement of said second means, said first control means including controllable extension means pivotally connected between said first and second means to control the displacement of the first means relative to the second means, said third means including a frame comprising spaced parallel tracks; said first means including rollers accommodated in said tracks, said frame supporting said second and third means.

11. Molding apparatus as claimed in claim 10, comprising heating means on said first means for generating an open flame to heat said mold.

12. Molding apparatus as claimed in claim 10, wherein said third means includes means to position the mold on said first means.

13. Molding apparatus as claimed in claim 10, wherein said second control means includes two arms pivotally coupled in parallel to said third means and pivotally coupled to and bracketing said first and second means.

14. Molding apparatus as claimed in claim 10, comprising means on said first means to rotate said mold and means on said first means for generating an open flame to heat said mold.

15. Molding apparatus as claimed in claim 10, wherein said third frame means includes first vertical beams extending upwardly from said tracks, beams extending between the tracks and vertical beams to brace the same in position, and a horizontal beam on at least one of said vertical beams and spaced above said tracks and consisting at least in part of a means to hoist said mold into position.

16. Molding apparatus as claimed in claim 15, wherein said second frame means includes spaced parallel beams between said tracks, second vertical beams extending upwardly from said spaced beams and spaced from said first vertical beams, and a triangular beam arrangement connecting said spaced parallel beams, said second control means including an extensible piston and cylinder means coupled between said triangular beam arrangement and said second means for tilting said axis of rotation to said angle of inclination.

17. Molding apparatus as claimed in claim 10, comprising rollers on said first means for supporting said mold for rotation, said rollers and mold having parallel axes of rotation.

18. Molding apparatus as claimed in claim 13, wherein said arms have a common pivot axis, comprising an arcuate support coupled in coaxial relation to and adapted to pivot with said arms on said pivot axis, cams spaced on said arcuate support, and limit switches positioned to be contacted and operated by said cams, said second control means being coupled to and operated by said limit switches.

19. Molding apparatus as claimed in claim 10, wherein said third frame means rests stationarily on a ground or floor support.

20. Molding apparatus as claimed in claim 19, comprising an oven in which said support is located.

* * * * *

UNITED STATES PATENT AND TRADEMARK OFFICE
CERTIFICATE OF CORRECTION

PATENT NO. : 5,554,394
DATED : September 10, 1996
INVENTOR(S) : Joseph FEAL, et al.

It is certified that error appears in the above-indentified patent and that said Letters Patent is hereby corrected as shown below:

On Title Page [22] should read;

--[22] PCT Filed:   May 6, 1992--; and insert

[86] PCT No.:   PCT/US92/03733

371 Date:   Dec. 6, 1994

102(e) Date:   Dec. 6, 1994

[87] PCT Pub. No.:   WO93/22123

PCT Pub Date:   Nov. 11, 1993

On the Title page, item [22], after "1994" please add
--PCT/US92/03733 05/06/92--.

Signed and Sealed this

Eighteenth Day of February, 1997

Attest:

BRUCE LEHMAN

*Attesting Officer*     *Commissioner of Patents and Trademarks*